US008185957B2

(12) United States Patent
Ahmed et al.

(10) Patent No.: US 8,185,957 B2
(45) Date of Patent: *May 22, 2012

(54) PERIPHERAL DEVICE

(75) Inventors: Mohamed Nooman Ahmed, Louisville, KY (US); Amanda Kay Bridges, Winchester, KY (US); Stuart Willard Daniel, Lexington, KY (US); William James Gardner Flowers, Lexington, KY (US); Charles Edward Grieshaber, Versailles, KY (US); Dennis Herbert Hasselbring, Lexington, KY (US); Michael Earl Lhamon, Lexington, KY (US); Chad Eugene McQuillen, Lexington, KY (US); Michael Ray Timperman, Versailles, KY (US)

(73) Assignee: Lexmark International, Inc., Lexington, KY (US)

( * ) Notice: Subject to any disclaimer, the term of this patent is extended or adjusted under 35 U.S.C. 154(b) by 1246 days.

This patent is subject to a terminal disclaimer.

(21) Appl. No.: 11/554,313

(22) Filed: Oct. 30, 2006

(65) Prior Publication Data
US 2008/0115222 A1   May 15, 2008

(51) Int. Cl.
*G06F 7/04* (2006.01)
*G06F 1/00* (2006.01)
*G06F 1/04* (2006.01)
*H04L 29/06* (2006.01)
*H04H 60/32* (2008.01)

(52) U.S. Cl. .......... 726/26; 726/2; 726/27; 713/164; 713/500; 713/600; 725/18

(58) Field of Classification Search .............. 713/161, 713/193, 164, 500, 600; 725/13, 18; 726/26, 726/2, 27
See application file for complete search history.

(56) References Cited

U.S. PATENT DOCUMENTS

| | | | |
|---|---|---|---|
| 4,414,537 A | 11/1983 | Grimes | |
| 4,937,762 A * | 6/1990 | Todome | 358/1.2 |
| 5,589,855 A * | 12/1996 | Blumstein et al. | 345/173 |
| 5,642,131 A | 6/1997 | Pekelney et al. | |
| 5,734,923 A | 3/1998 | Sagawa et al. | |
| 5,736,978 A | 4/1998 | Hasser et al. | |
| 5,896,129 A | 4/1999 | Murphy et al. | |
| 6,061,666 A | 5/2000 | Do et al. | |
| 6,267,598 B1 | 7/2001 | Allen, Jr. et al. | |
| 6,278,441 B1 | 8/2001 | Gouzman et al. | |
| 6,464,135 B1 | 10/2002 | Cohen et al. | |
| 6,496,182 B1 | 12/2002 | Wong et al. | |
| 6,549,789 B1 | 4/2003 | Kfoury | |
| 6,636,202 B2 | 10/2003 | Ishmael, Jr. et al. | |
| 6,760,408 B2 | 7/2004 | Crosson et al. | |
| 6,856,333 B2 | 2/2005 | Ullmann et al. | |
| 6,883,981 B2 | 4/2005 | Kizaki et al. | |
| 6,917,437 B1 | 7/2005 | Myers et al. | |
| 6,918,091 B2 | 7/2005 | Leavitt et al. | |
| 6,950,205 B2 | 9/2005 | Takeo | |
| 6,952,577 B2 | 10/2005 | Michaelis et al. | |
| 7,162,685 B2 * | 1/2007 | Saito | 714/813 |
| 7,440,709 B2 * | 10/2008 | Mima et al. | 399/82 |
| 7,494,050 B1 * | 2/2009 | Bowen et al. | 235/379 |
| 2003/0036909 A1 * | 2/2003 | Kato | 704/275 |
| 2007/0076241 A1 * | 4/2007 | Okamoto | 358/1.14 |

* cited by examiner

Primary Examiner — Mohammad Reza

(57) ABSTRACT

A method for an impaired user to control a peripheral device including receiving key-value pair input from the user, determining whether the received input is valid and executing a job generated from the valid received key-value pair input.

19 Claims, 4 Drawing Sheets

FIG. 4A

| FUNCTION CODE | FUNCTION |
|---|---|
| 1 | Copy |
| 2 | Fax |

FIG. 4B

| FUNCTION | FEATURE | FEATURE CODE | ACCEPTABLE VALUES |
|---|---|---|---|
| Copy | Number of Copies | 1 | 1-999 |
| Copy | Number of Original Sides | 2 | 1 = single-sided<br>2 = double-sided |
| Copy | Number of Output Sides | 3 | 1 = single-sided<br>2 = double-sided |
| Copy | Stapled Output | 4 | 0 = no<br>1 = yes |
| Fax | Phone Number | 1 | Numbers Only |
| Fax | Number of Original Sides | 2 | 1 = single-sided<br>2 = double-sided |

PERIPHERAL DEVICE

CROSS REFERENCES TO RELATED APPLICATIONS

This application relates to co-pending U.S. non-provisional patent application Ser. No. 11/555,071 titled, "Access to Networked Peripheral Device for Impaired Users" and co-pending U.S. non-provisional patent application Ser. No. 11/555,015 titled, "Supplemental Sensory Input/Output for Accessibility," both of which were filed contemporaneously herewith and are assigned to the assignee of the present application.

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Invention

The present invention relates generally to printers and multi-function peripheral (MFP) devices, and more particularly to a peripheral device adapted to disabled or physically impaired users.

2. Background

Many of today's printers, MFP devices and other information technology (IT) devices support "walk-up" user-initiated functions such as confidential print, copy, facsimile, and so forth. A user interface (UI) typically enables a selection of a function and related attributes to be entered for the selected function.

These devices often employ a touch screen UI, which requires a user to be able to visually see and discern information presented on the UI to select a function and/or select attributes associated with the selected function. This can restrict an impaired user's ability to use the device.

In 1998, Congress amended the Rehabilitation Act to require Federal agencies to make their electronic and information technology accessible to people with disabilities. Inaccessible technology interferes with an individual's ability to obtain and use information quickly and easily. Section 508 was enacted to eliminate barriers in information technology, to make available new opportunities for people with disabilities, and to encourage the development of technologies that will help achieve these goals. The law applies to all Federal agencies when they develop, procure, maintain, or use electronic and information technology. Under Section 508 (29 U.S.C. §794d), agencies must give disabled employees and members of the public access to information that is comparable to the access available to others.

SUMMARY OF THE INVENTION

The present invention provides methods and apparatuses, including computer program products, for a peripheral device user interface for users.

In general, in one aspect, the present invention features a method for controlling a peripheral device including receiving a key-value pair input from a user, determining whether the key-value pair input is valid for a desired function, and executing a job generated from the valid key-value pair input.

In embodiments, the key-value pair input can be alphanumeric characters representing a desired feature and its associated value.

One method for controlling a peripheral device may include signaling the user whether the key-value pair input is valid. Signaling can include a first audio sound signifying valid key-value input, and a second audio sound signifying invalid key-value input.

The job can include a request for the peripheral device to perform a desired function including one or more desired features.

In another aspect, the present invention features a method for a user to control a peripheral device including receiving input from the user, determining whether the received input is valid, signaling in response to the determining, receiving a completion indication from the user, and executing a job generated from valid received input.

In embodiments, the input can include a key-value pair. The input can also include one or more alphanumeric characters representing a desired attribute and its associated value. Determining can include checking that one input represents a valid peripheral device function and an associated attribute.

One method for controlling a peripheral device may include signaling the user whether the input is valid. Signaling can include a first audio sound signifying valid received input, and a second audio sound signifying invalid received input.

The completion indication can be a special function key on an operational panel linked to the peripheral device.

The job can include a request for the peripheral device to perform a function including a desired attribute.

The present invention can be implemented to realize one or more of the following advantages.

The method enables a user to locate and distinguish an input device without activating it. The method enables the impaired user to ascertain that a peripheral device is in a ready state and enables the impaired user to select a function and associated attributes, all without a need to see or discern information presented visually on the device's standard user interface.

One implementation of the present invention provides all of the above advantages.

BRIEF DESCRIPTION OF THE DRAWINGS

The above-mentioned and other features and advantages of the present invention, and the manner of attaining them, will become more apparent, and the present invention will be better understood by reference to the following description of embodiments of the present invention in conjunction with the accompanying drawings, wherein:

FIG. 4A is a table of exemplary function codes.

FIG. 4B is a table of exemplary key-value pairs.

Like reference numbers and designations in the various drawings indicate like elements.

DETAILED DESCRIPTION

Figure 1:
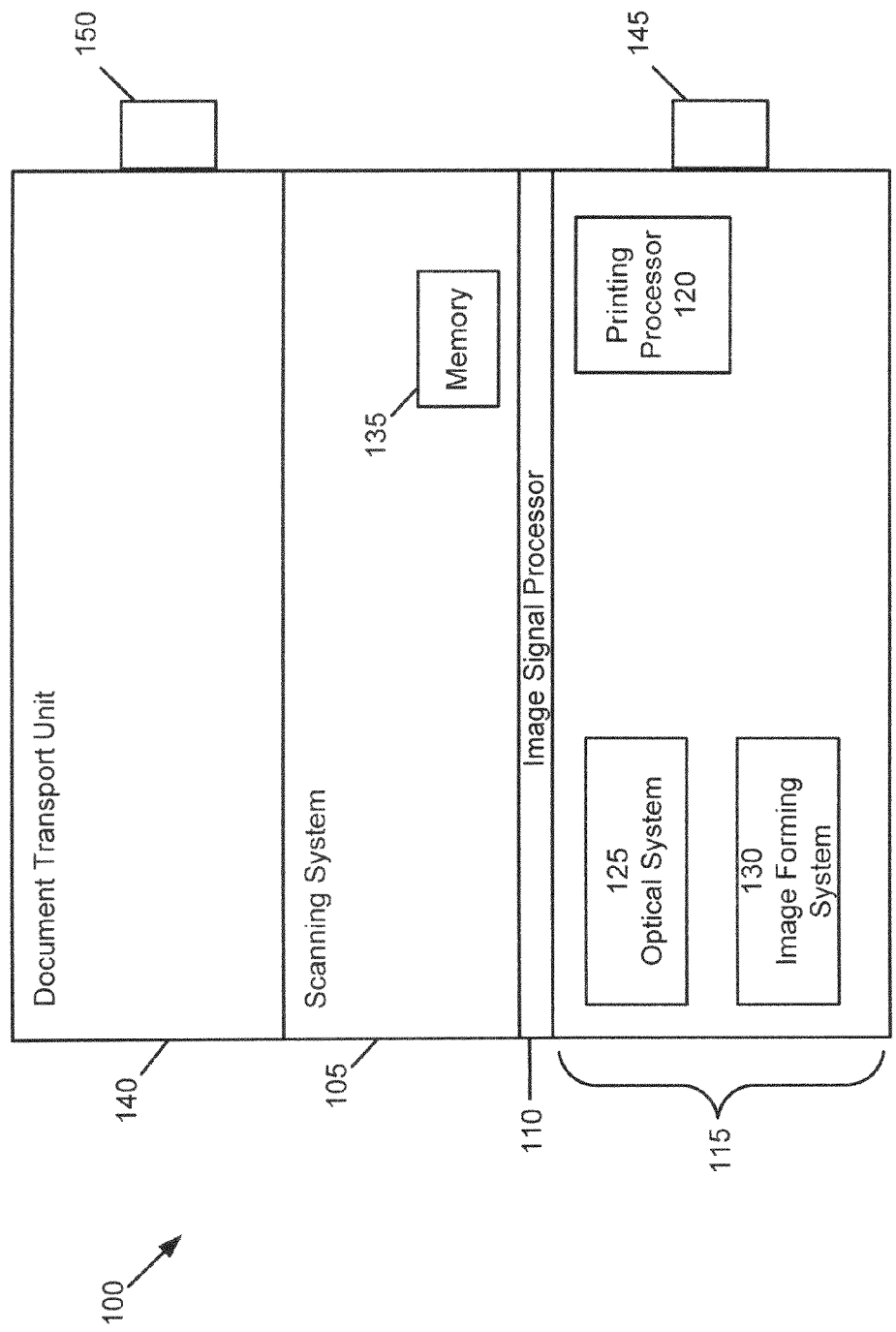
FIG. 1 is a block diagram of an exemplary multifunction peripheral (MFP) device.

It is to be understood that the present invention is not limited in its application to the details of construction or the arrangement of components set forth in the following description or illustrated in the drawings. The present invention is capable of other embodiments and of being practiced or of being carried out in various ways. Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments of the present invention may include both hardware and electronic components or modules that, for purposes of discussion, may be illustrated and described as if the majority of the components were implemented solely in hardware. However, one of ordinary skill in the art, based on a reading of this detailed description, would recognize that, in at least one embodiment, the electronic based aspects of the present invention may be implemented in software. As such, it should be noted that a plurality of hardware and software-based devices, as well as a plurality of different structural components may be utilized to implement the present invention. Furthermore, and as described in subsequent paragraphs, the specific mechanical configurations illustrated in the drawings are intended to exemplify embodiments of the present invention, and other alternative mechanical configurations are possible.

As shown in FIG. 1, an exemplary multi-function peripheral (MFP) device 100 includes a scanner, scanning unit or scanning system 105 and an image signal processor 110. The MFP device 100 includes a printer or printing unit 115 including a printing processor 120, an optical system 125, and an image forming system 130. MFP device 100 also includes a memory 135, a document transporting unit 140, a duplex unit 145 and an exemplary operation (e.g., input/output) panel 150. The operation panel 150 is attached, for example, on top of MFP device 100 for executing operations or functions, such as copying, faxing, scanning, or e-mailing and for displaying device options or conditions, such as duplex copying or stapling. In an alternate embodiment, operation panel 150 may be integrated or housed within MFP device 100. Scanning system 105 reads a document and converts the obtained data into an image data. Memory unit 135 transmits image data and color data, if applicable, to the printing unit 115 either directly, or through a memory installed therein. The image data and color data may also be transmitted to a user's workstation or computer for further processing or storage. The image data and color data may also be transmitted to a desired destination by facsimile or electronic mail.

Figure 2:
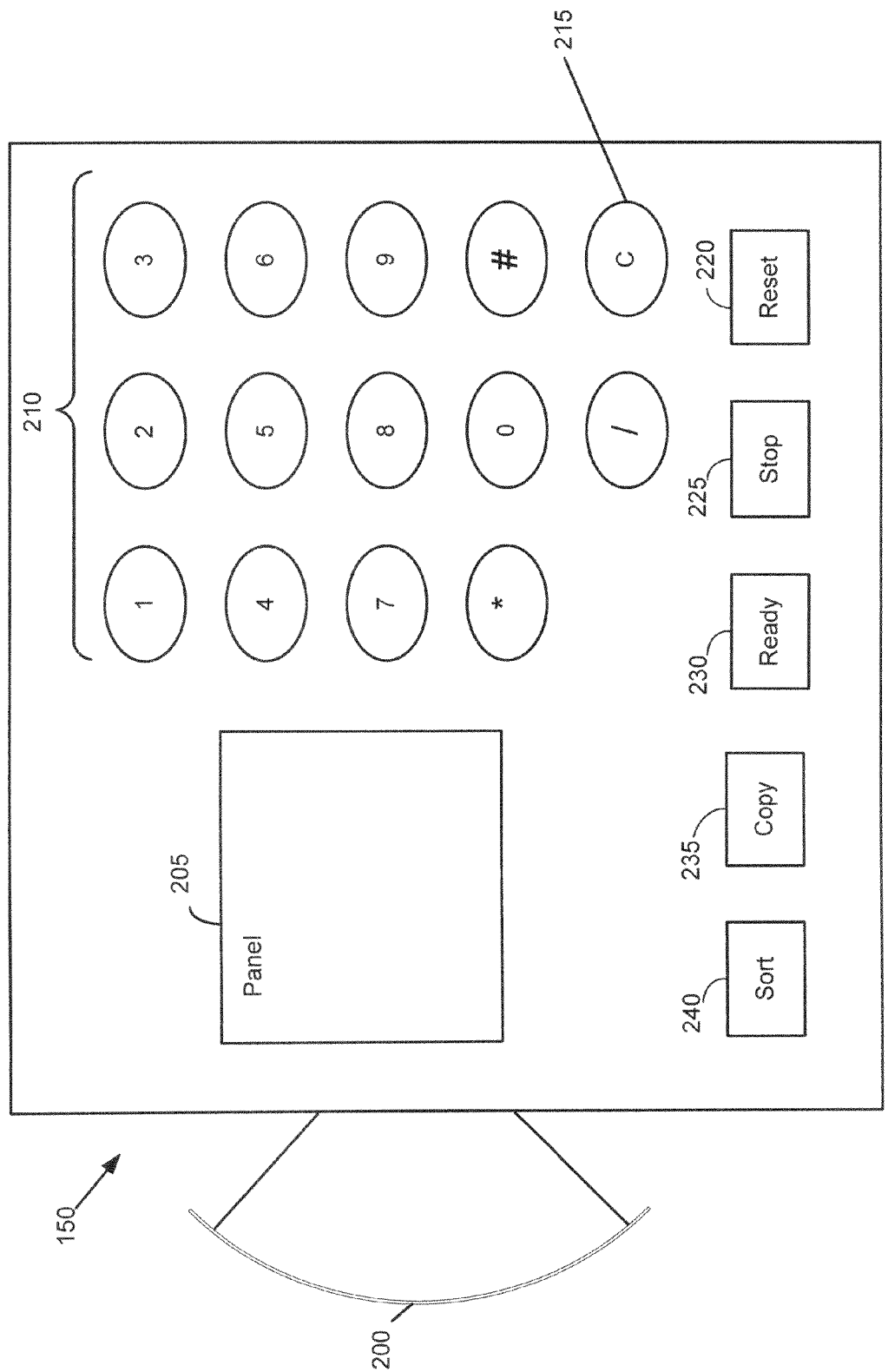
FIG. 2 is a block diagram of an exemplary operation panel adapted to the MFP device of FIG. 1.

As shown in FIG. 2, operation panel 150 can include, for example, a signaling device 200, such as a sound generating or audio signaling device (e.g., beeper, tone generator, audio speaker, and so forth) and a display screen or touch panel 205 for indicating a warning, such as jamming, a service man call, and paper empty, or other information, attributes or conditions such as a threshold level, magnification ratio, and copy sheet size.

In an alternate embodiment, the MFP device may include a data communication device, such as a Bluetooth or Wireless USB transceiver, instead of or in addition to the sound generating or audio signaling device, for communicating with a user's digital receiver, such as may be contained in a Bluetooth-enabled cell phone, over a short-range data communication network, such as a Bluetooth or USB network. In such an embodiment, the MFP device may be able to transmit feedback to the user in the form of tones or voice messages over the communication network via equipment already used by the user for other purposes, such as a Bluetooth-enabled cell phone.

Operation panel 150 may also include a keypad or key group 210 for entering input such as the desired number of copies and magnification ratio; a "Clear" key 215 for clearing the input entered at keypad 210; a panel "Reset" key 220 for clearing all of the set conditions; a "Stop" key 225 for stopping or halting operation of MFP device 100; a "Ready" key 230 for starting or commencing the current or desired operation; a "Copy" key 235 for setting a desired copying mode (e.g., one of single-single side, double-single side, single-double side, double-double side modes, and so forth); and a "Sort" key 240 for setting an electronic sorting mode. In an alternate embodiment, the functions associated with the keys can also be communicated through display 205.

Figure 3:
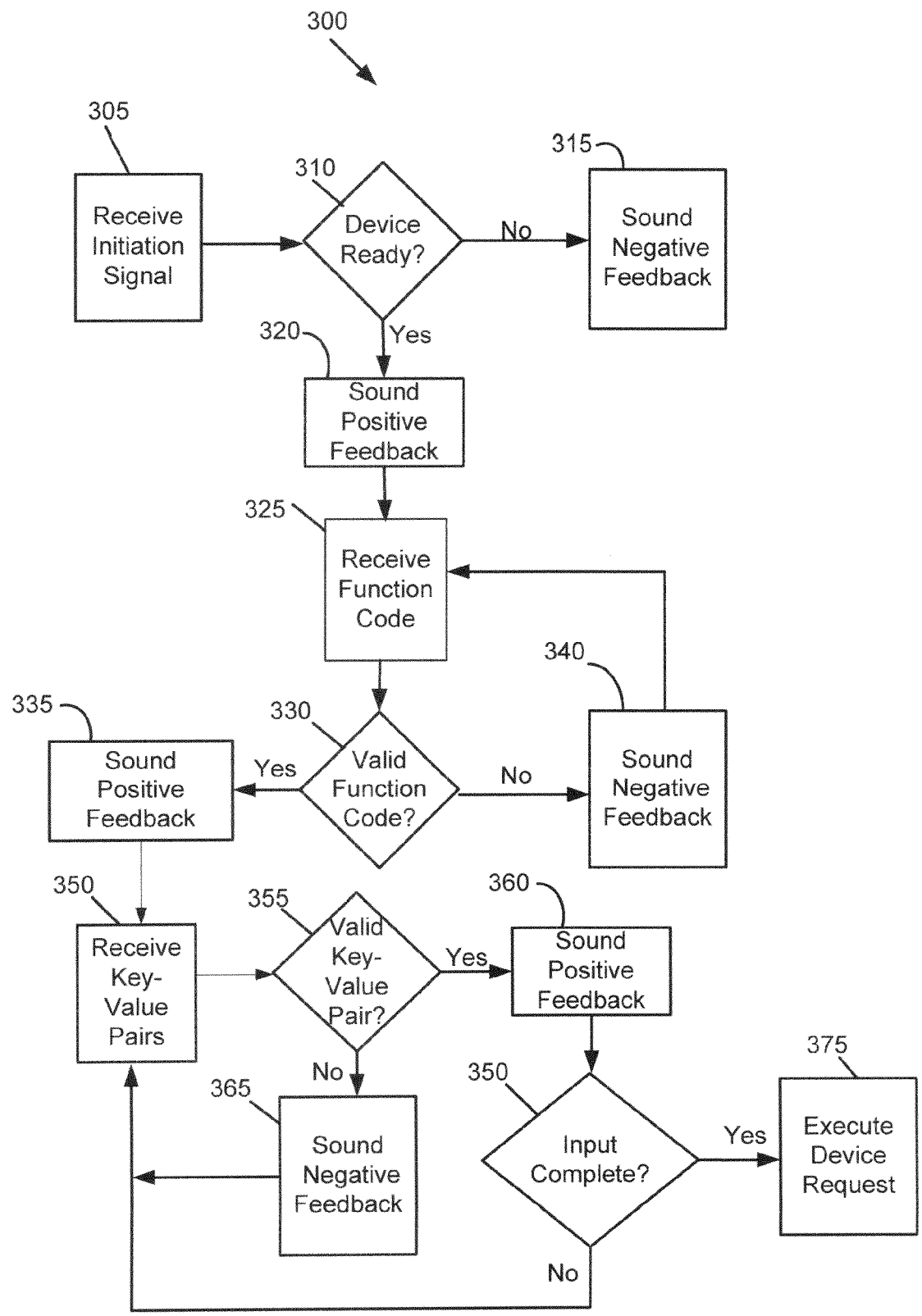
FIG. 3 is a flow diagram of a process for generating and executing a job in accordance with the present invention.

One exemplary process 300 for generating and executing a job is illustrated in FIG. 3. More particularly, process 300 allows a user to key in functions and associated attributes, instructions and features using keys located on MFP device 100, without the use of special technology for impaired users, such as an interactive voice response (IVR) system, large viewing screen, screen radar, touch screen or voice recognition system.

Process 300 treats received input as function codes or key-value pairs, associating the received feature and value input with feature, attribute, parameter or instructions associated with the desired function to execute. Preferably, the function codes or key-value pairs are preset or predetermined by the manufacturer. However, the function codes or key-value pairs may also be set by a system administrator or other person authorized to set up MFP device 100. For example, as shown in table FIG. 4A, if MFP device 100 is a combined photocopy/facsimile machine, a function code of "1" may represent the "copy" function, and a function code of "2" may represent the "fax" function.

Continuing with this particular example, as shown in FIG. 4B, a copy function feature code of "1" may represent the feature of how many copies to make; a copy function feature code of "2" may represent the number of original sides of the document to be copied; a copy function feature code of "3" may represent the number of output sides of the document to be copied; a copy function feature code of "4" may represent whether the output copies are to be stapled; a fax function feature code of "1" may represent the phone number to which the document is to be faxed; and a fax function feature code of "2" may represent the number of original sides of the document to be faxed.

The value entered after the function feature code may represent the actual value associated with the desired feature, attribute or instruction, and acceptable values for such desired feature, attribution or instruction may be preset or predetermined. As shown in FIG. 4B, acceptable values for the number of copies feature may be 1 through 999, and acceptable values for the number of original sides for the document to be copied may be "1" or "2," where "1" equals a single-sided document and "2" equals a double-sided document. Similarly, acceptable values for the number of output sides may be "1" or "2," where "1" equals a single-sided copy and "2" equals a double-sided copy. Acceptable values for stapled output copies feature may be "0" or "1", where "0" equals no stapled output and "1" equals stapled output. Acceptable values for the fax phone number feature may be numbers only, and acceptable values for the number of original sides of the document to be faxed may be "1" or "2," where "1" equals a single-sided document and "2" equals a double-sided document.

As will be appreciated by one of ordinary skill in the art, the functions and features enumerated in FIGS. 4A and 4B are exemplary, and there may be may other functions and associated features, attributes or instructions that may be preset or predetermined. Additionally, the function code, feature code, and acceptable feature values may vary and be represented in other manners.

Referring back to FIG. 3, an initiation input signal is received from a user (block 305) to return MFP device 100 to a pre-defined home state ready for input. The user can generate such signal by locating and activating or pressing any key or on the operation panel 150 of MFP device 100 or a preset or predetermined button or key, such as an idle or "Ready" key 230, to begin the job setup and execution process. The initiation input signal may also be numeric input entered at operation panel 150 using keypad 210 or a touchscreen display. In another example, the initiation input signal may be the picking up (i.e., off-hook signal) of a telephone headset connected to the operation panel 150. In yet another example, the activation signal may be a signal generated from a portable auxiliary device being connected to MFP device 150, such as a flash memory device.

At block 310, MFP device 100 may verify whether MFP device 100 is ready to receive and perform requested functions. MFP device 100 may also provide the appropriate ready state feedback (blocks 315, 320) to the user, such as through an audio signal or visual display on operation panel 290. For example, if MFP device 100 is not in a ready state, it may provide negative feedback, such as a "razz" sound, to indicate that a job request cannot be honored, possibly due to, for example, MFP device 100 being in an intervention required state (e.g., out of paper or network down) and that further input is futile. If MFP device 100 is in a ready state, it may provide positive feedback, such as a "ding" sound, to indicate that requests can be honored and that MFP device 100 is ready to solicit user selections or input and perform desired functions. In another embodiment, the display screen 205 may flash a certain color, such as red, indicating negative feedback and another color, such as green, indicating positive feedback. In yet another embodiment, feedback may be provided through a tone or voice message through a user's digital receiver.

At block 325, if MFP device 100 is in a ready state, MFP device 100 receives a function code, and possibly a delimiter to indicate that the entry of the desired function code is complete, from a user. For example, if a user wishes to perform a copy function, MFP device 100 may receive a "1" and a delimiter, such as an asterisk or pound symbol.

At block 330, MFP device 100 determines whether the function code received is valid. Validation includes verifying that the function requested will be recognized by MFP device 100.

Once validation at block 330 has been performed, feedback may be provided to the user (blocks 335, 340). Positive feedback, such as sounding a "ding" or voicing a success, indicates that a valid function has been selected (block 335), and negative feedback, such as sounding a "razz" or voicing an error, may be signaled an invalid function call (block 340). If the function code is invalid, MFP device 100 does not generate a job request.

If the function code is valid, MFP device 100 may receive key-value pairs representing features, attributes, instructions or parameters associated with the valid function code (block 350). Continuing with the copy function example, if a user wishes to make multiple copies, such as 23, MFP device 100 may receive a "1" and first delimiter, such as an asterisk, which indicates that the entry of the desired feature code is complete, and a "23", and a second delimiter, which indicates that the entry of the value associated with the desired feature code is complete.

At block 355, MFP device 100 determines whether the key-value pair or feature code and associated feature value received are valid. For example, validation may help ensure that the feature code can be associated with the desired function and recognized by MFP device 100 and that the feature value inputted is valid for the desired feature, attribute, parameter or instruction. Validation may further include checking to make sure that required parameters have been set.

Once validation at block 355 has been performed, feedback may be provided to the user (blocks 360, 365). Positive feedback, such as sounding a "ding", voicing a success or flashing a certain color on display screen 205, indicates that a valid feature has been selected (block 360), and negative feedback, such as sounding a "razz", voicing an error or flashing a different color on display screen 205, may be signaled for an invalid feature call or if an invalid value is associated with the feature call (block 365). If the feature key-value pair is invalid, MFP device 100 ignores the key-value pair.

The input, validation and feedback processes may be repeated until all required and desired features, attributes, instructions or parameters have been defined or an indication that the job creation or setup operation is complete, such as an end of input indicator or job creation indicator, a perform function signal, or a job submission indicator, is received (block 370). Once all job attributes, parameters, and instructions have been set, the job may also be known as a job program or job ticket. It will be appreciated by one of ordinary skill in the art that validation of the job may also occur after a predetermined number of key-value pair inputs or after an end of input indication is received rather than after each individual key-value pair input.

At block 375, the job is executed using valid received key-value pair inputs.

Using the example of the photocopy/facsimile machine described above, a request for a copy may occur as follows. The user presses "Ready" key 230 on operation panel 150. Once MFP device 100 verifies that MFP device is in a ready state, it may provide positive feedback. The user then inputs the desired function code, such a "1" to indicate the copy function, and a delimiter, such as an asterisk or pound symbol, to indicate the function code input is complete. After MFP device 100 verifies that a valid function has been selected, it may provide positive feedback.

The user may then enter feature key-value pairs in any format acceptable to MFP device 100, such as in the format of a feature code, a first delimiter, a feature value and a second delimiter. A first delimiter, such as an asterisk, indicates the feature code input is complete, and a second delimiter, such as a pound symbol, indicates the feature value input is complete. As will be appreciated by one of ordinary skill in the art, the delimiters may be any symbol or sequence of symbols recognized by the MFP as an end of input indicator. It will also be appreciated by one of ordinary skill in the art that the key-value pairs may be inputted in any order or sequence and that all of the feature key-value pairs associated with a particular function may not be used for in every job request (i.e., only the desired features associated with the desired function need to be inputted).

After MFP device 100 verifies whether a valid feature key-value pair has been entered, it may provide positive or negative feedback, as appropriate. The user may then attempt to input another key-value pair. Once input a job submission indicator is received, MFP device 100 executes the job request, which is formed from valid key-value pairs received.

In an alternate embodiment, verification may not be performed and/or feedback may not be provided at all or only after the entry of the function code or after certain number feature key-value pairs. In such an embodiment, MFP device 100 verifies job request upon the receipt of a job submission indicator and executes the job request using only the valid key-value pairs inputted. For example, input by the user of 1*1*23#2*2#4*1## after pressing "Ready" Key 230 would generate a job request for 23 copies of a stapled double-sided document. However, input by the user of 1*1*23#2*2#4*3## after pressing "Ready" Key 230 would generate a job request for 23 copies of a double-sided document since the feature key-value pair relating to the stapling of the document (i.e., 4*3#) would be ignored since "3" is an invalid value for the Stapled Output feature.

One way method 300 can be practiced is device 100. In other embodiments, method 300 is resident in memory of a portable device, such as a flash memory device that can be connected to the MFP device 100, such as through a Universal Serial Bus (USB). In this example, plugging the portable device into the MFP device 100 initiates process 100 residing in the portable device.

Embodiments of the present invention can be implemented in digital electronic circuitry, or in computer hardware, firmware, software, or in combinations of thereof. Embodiments of the present invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

The exemplary embodiments of the present invention can be performed by one or more programmable processors executing a computer program to perform functions of the present invention by operating on input data and generating output. The exemplary embodiments can also be performed by, and apparatus of the present invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

The foregoing description of several methods and an embodiment of the present invention have been presented for purposes of illustration. It is not intended to be exhaustive or to limit the present invention to the precise steps and/or forms disclosed, and obviously many modifications and variations are possible in light of the above teaching. It is intended that the scope of the present invention be defined by the claims appended hereto.

What is claimed is:

1. A method for controlling a peripheral device comprising:
    receiving a first code input;
    determining whether the first code input is valid;
    receiving a second code input if the first code input is determined to be valid, the second code input being a value associated with the first code input;
    determining whether the second code input is valid for the first code input; and
    executing a job generated from the valid first code input and second code input;
    wherein at least one of the receiving the first code input, the determining whether the first code input is valid, the receiving a second code input, the determining whether the second code input is valid and the executing is performed by a processor.

2. The method of claim 1, wherein the first code input and the second code input are one or more alphanumeric characters, the first code input representing a desired feature and the second code input representing a value associated with the desired feature.

3. The method of claim 1, further comprising, signaling the user whether first code input and the second code input is valid.

4. The method of claim 3, wherein signaling comprises:
    a first audio sound signifying the valid first code-input and the valid second code input; and
    a second audio sound signifying invalid first code input and invalid second code input.

5. The method of claim 3, wherein the signaling is accomplished via a data network in communication with a digital receiver.

6. The method of claim 2, wherein the determining whether the first code input is valid comprises verifying the associated feature value is an acceptable value for the desired feature.

7. The method of claim 1, wherein the job comprises a request for the peripheral device to perform the desired function including a desired feature.

8. A method for a user to control a peripheral device, comprising:
    receiving a first code input from the user;
    determining whether the received first code input is valid;
    receiving a second code input from the user, the second code input associated with the first code input;
    determining whether the received second code input is valid;
    receiving a completion indication from the user; and
    executing a job generated from the valid received first code input and second code input;
    wherein at least one of the receiving the first code input, the determining whether the first code input is valid, the receiving the second code input, the determining whether the received second code input is valid, the receiving the completion indication, and the executing is performed by a processor.

9. The method of claim 8, wherein the first code input and the second code input comprise one or more alphanumeric characters, the first code input representing a desired attribute and the second code input representing a value associated with the desired attribute.

10. The method of claim 8, wherein the determining whether the first code input is valid comprises checking that the first code input represents a valid peripheral device function and an associated attribute.

11. The method of claim 8, further comprising signaling the user whether the first code input and the second code input are valid, wherein the signaling includes
   a first audio sound signifying the valid received first code input and the valid received second code input; and
   a second audio sound signifying invalid received first code input and invalid received second code input.

12. The method of claim 8, wherein the completion indication is a special function key on an operational panel linked to the peripheral device.

13. The method of claim 8, wherein the job comprises a request for the peripheral device to perform a function including a desired attribute.

14. A computer program product, tangibly embodied in a non-transitory machine-readable storage device, for controlling a peripheral device, the computer program product being operable to cause a data processing apparatus to:
   receive a first code input from a user;
   determine whether the first code input is valid;
   receive a second code input from the user if the received first code input is valid;
   determine whether the second code input is valid for the first code input;
   execute a job generated from the valid first code input and the valid second code input.

15. The computer program product of claim 14, wherein the first code input and the second code input are one or more alphanumeric characters, the first code input representing a desired feature, and the second code input representing an associated value.

16. The computer program product of claim 14, wherein the determining whether the first code input is valid comprises verifying the associated feature value is an acceptable value for the desired feature.

17. The computer program product of claim 14, wherein the computer program product is operable to cause the data processing apparatus to signal the user whether at least one of the first code input and the second code input is valid.

18. The computer program product of claim 17, wherein signaling comprises:
   a first audio sound signifying the valid first code input and the valid second code input; and
   a second audio sound signifying invalid first code input and invalid second code input.

19. The computer program product of claim 14, wherein the job comprises a request for the peripheral device to perform a function including a desired feature.

\* \* \* \* \*